United States Patent [19]

Föhl

[11] Patent Number: 5,350,194
[45] Date of Patent: Sep. 27, 1994

[54] LINEAR DRIVE FOR VEHICLE RESTRAINING SYSTEMS

[75] Inventor: Artur Föhl, Schorndorf, Fed. Rep. of Germany

[73] Assignee: TRW Repa GmbH, Alfdorf, Fed. Rep. of Germany

[21] Appl. No.: 21,774

[22] Filed: Feb. 24, 1993

[30] Foreign Application Priority Data

Mar. 5, 1992 [DE] Fed. Rep. of Germany ....... 4206980

[51] Int. Cl.$^5$ .................................. B60R 22/46
[52] U.S. Cl. ................. 280/805; 280/806; 297/480
[58] Field of Search .............. 188/322.22, 371, 374, 188/375, 377; 280/806, 805; 297/480; 60/632, 635, 636, 637, 638

[56] References Cited

U.S. PATENT DOCUMENTS

| 3,917,031 | 11/1975 | Doin et al. | 297/480 |
| 4,201,418 | 5/1980 | Reidelbach | 280/805 |
| 4,258,934 | 3/1981 | Tsuge et al. | 297/480 |
| 4,328,976 | 5/1982 | Tsuge et al. | 280/806 |
| 4,423,846 | 1/1984 | Föhl | . |
| 4,441,738 | 4/1984 | Tsuge et al. | 280/806 |
| 4,449,443 | 5/1984 | Föhl | 60/636 |
| 5,129,679 | 7/1992 | Specht | 297/480 |

FOREIGN PATENT DOCUMENTS

| 2304878 | 8/1974 | Fed. Rep. of Germany . | |
| 2408173 | 9/1974 | Fed. Rep. of Germany . | |
| 2540952 | 4/1977 | Fed. Rep. of Germany . | |
| 2809587 | 9/1978 | Fed. Rep. of Germany | 297/480 |
| 3024495 | 1/1981 | Fed. Rep. of Germany | 280/806 |
| 8406217.7 | 9/1985 | Fed. Rep. of Germany . | |
| 3407379 | 6/1986 | Fed. Rep. of Germany . | |
| 3900024 | 7/1990 | Fed. Rep. of Germany | 280/806 |
| 2217181 | 10/1989 | United Kingdom . | |

Primary Examiner—Karin L. Tyson
Attorney, Agent, or Firm—Tarolli, Sundheim & Covell

[57] ABSTRACT

In a linear drive for belt pretensioner in vehicle restraining systems a piston/cylinder unit (10) is used, the piston of which is subjected to pressure by the gases generated by a pyrotechnical gas generator (26). A pulling cable (12) is connected to the piston (24), said connection not being direct but with interposition of a damping means (32) which in the phase of the pressure rise of the gases limits the force exerted on the pulling cable (12) and allows said force to increase smoothly and is effective during a substantial fraction of the initial phase of the piston movement in which the gas pressure (D) generated by the generator (26) rises.

18 Claims, 2 Drawing Sheets

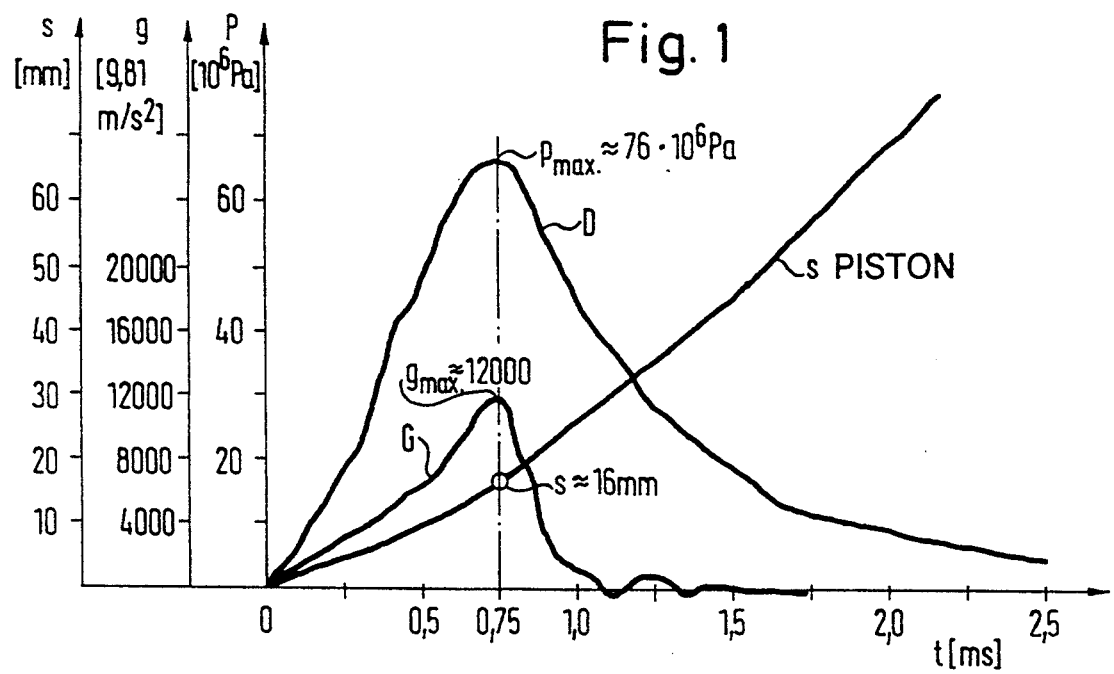
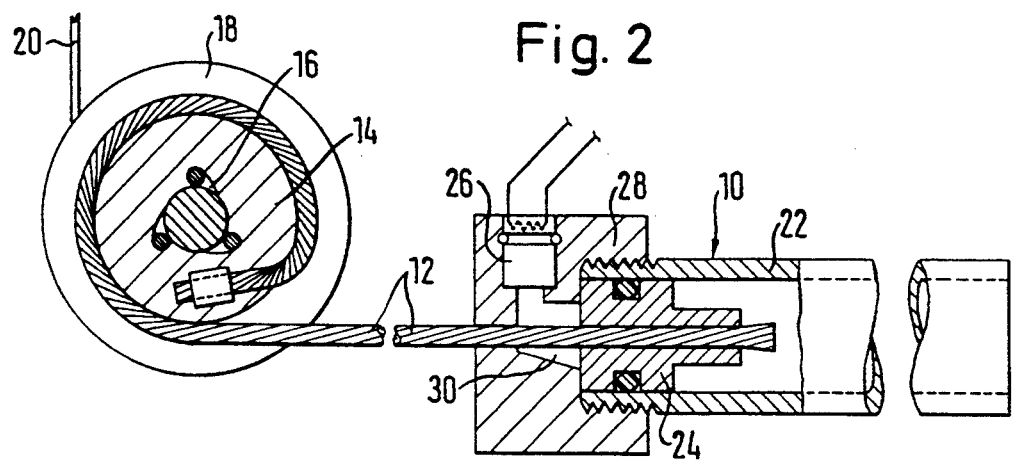
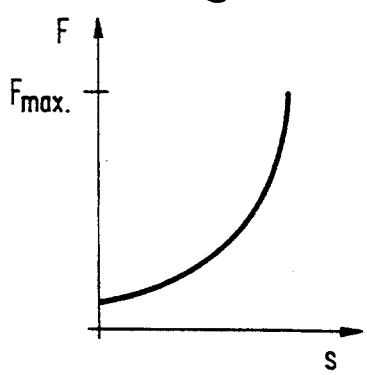
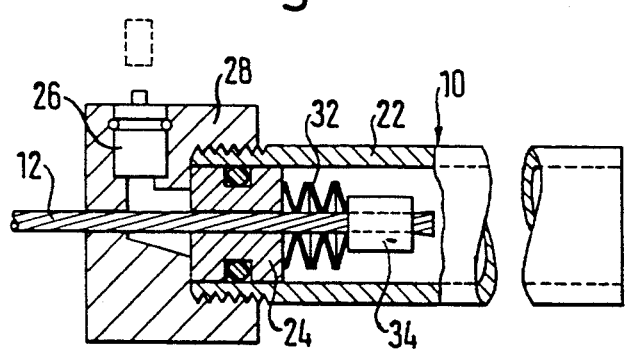

LINEAR DRIVE FOR VEHICLE RESTRAINING SYSTEMS

The present invention relates to a linear drive for vehicle restraining systems comprising a pyrotechnical gas generator and a piston/cylinder unit which is activatable by the gases generated by the generator. The piston of the linear drive is connected to a pulling cable which, in turn, engages the reel of a belt retractor to rotate the same in the winding direction, or some other means appropriate for shortening the effective length of the seat belt webbing.

The effectiveness of belt pretensioners of various designs is an established fact. Recent tests have shown that the protective action of the safety belt can be even further enhanced if the pretensioning takes place with a force greater than in conventional belt pretensioners. The power of a belt pretensioner can be increased by increasing the dimensions of the pyrotechnical gas generator. Apart from the linear drive itself, the pulling cable and the mechanism via which the increased force is transmitted to the webbing must then also be given greater dimensions to withstand the loads occurring.

The invention is based on the recognition that an increase in the pretensioner power can be achieved without, or at least without appreciable, increase of the power of the gas generator by improving the utilization of the energy liberated by the gas generator. According to the invention the piston and pulling cable are coupled together via a damping means which limits the force exerted by the piston on the pulling cable in the phase of the pressure rise of the gases generated by the gas generator and allows said force to increase continuously, preferably progressively. According to the conventional conception of the mode of operation of a piston/cylinder unit having a pyrotechnical gas generator, the mechanical power obtainable is governed primarily by the axial force which acts on the piston and which is generated by the gas pressure acting on the end face of the piston. The underlying idea here is that the force is available over the entire travel of the piston in the cylinder. The invention is based on the recognition that this assumption is wrong. The gas pressure generated by available gas generators rises after ignition of the gas generator firstly steeply and after as little as one ms or less reaches a maximum value. Thereafter the pressure decreases again and about 3 ms after the ignition has less than 10% of its maximum value. By far the greater part of the energy liberated by the gas generator is thus available only during a fraction of the time which the piston requires for a complete travel of for example 200 mm. Due to the step of the invention, according to which the piston and pulling cable are coupled together via a damping means, the energy liberated by the gas generator is convened in optimum manner to acceleration of the piston. In particular, as a result the maximum of the piston acceleration coincides at least approximately with the maximum of the gas pressure curve along the time axis. The damping should therefore be effective during the entire initial phase of the piston movement in which the gas pressure generated by the gas generator rises. In this initial phase the piston covers a comparatively small distance of about 5 to 15% of the total piston stroke. With a piston stroke of 200 mm the piston covers, for example, a distance of only about 16 mm in this initial phase. The invention is further based on the recognition that a way must be found of storing the energy liberated by the gas generator and available in conventional constructions for only about 2 to 3 ms, so that the force required for the belt pretensioning remains available over the entire travel of the belt pretensioner. It has been found that this storing can take place only mechanically. When using a belt pretensioner which is arranged on the belt retractor and engages on the belt reel via a coupling mechanism, the belt reel, with the webbing coiled thereon, may be regarded as energy accumulator. The belt reel must therefore be accelerated within 1 to 2 ms to a rotational speed such that in the subsequent phase, in which the gas pressure has almost completely disappeared, the inertia moment of the belt reel and webbing coiled thereon suffices to make the necessary force available over the entire pretensioner travel. The torque engaging the belt reel should rise steeply after ignition of the gas generator, but not too abruptly. By the damping means, the optimum profile of the torque becoming effective at the belt reel can be set. It is particularly favourable for the force transmitted by the piston to the pulling cable through the damping means to increase progressively with the distance covered during the phase of the pressure rise.

Depending on the construction of the gas generator and the composition of its pyrotechnical charge, the period in which the gas pressure is available may also be somewhat longer than 2 to 3 ms and the drop of the gas pressure curve less steep. In such cases the gas pressure also makes a contribution to the drive power during the intermediate phase and end phase of the piston movement. Fundamentally, however, in such constructions as well by far the greater part of the energy is liberated within 2 to 3 ms directly after the ignition and consequently the greater part of the drive power thereafter must be provided by the mechanical energy which is stored in the rotational movement of the belt reel and the webbing disposed thereon.

From DE-OS 23 04 878 a linear drive is known which comprises a piston to which a pulling rod is connected. A limitation of the force developed by the linear drive is obtained in that a relief valve is opened when a predetermined limit force is exceeded and a spring biasing the relief valve to its closed position is compressed. In normal operation of the linear drive, the relief valve remains closed. In contrast, according to the present invention the force developed by the linear drive is maximized by completely converting the available energy into mechanical driving power.

As damping means, fundamentally two constructions are possible: In the first construction the damping means is a resiliently yieldable member which is inserted into the force transmission path between the piston and pulling cable; in the second construction the damping means is formed by a plastically deformable member which is likewise inserted into the path of the force transmission between the piston and pulling cable. Various embodiments of the damping means are set forth in the subsidiary claims.

Further features and advantages of the invention will be apparent from the following description and from the drawings, to which reference is made and in which:

FIG. 1 shows a diagram representing the variation of the gas pressure, piston acceleration and piston travel as a function of the time;

FIG. 2 is a schematic illustration of a pyrotechnical linear drive for a belt pretensioner engaging a belt retractor;

FIG. 3 shows a diagram indicating the desired profile of the force acting in the pulling cable as a function of the travel in the initial phase of the piston movement;

FIG. 4 is a sectional view of a first embodiment of a linear drive which is provided according to the invention with a damping means between the piston and the pulling cable;

Figure 5A:
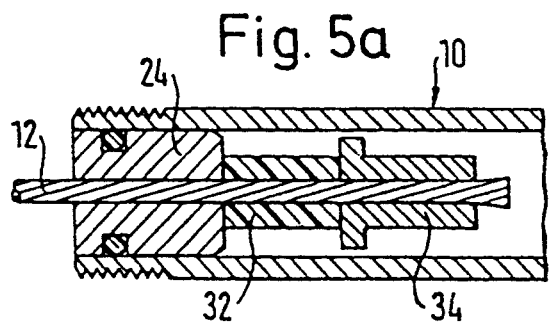
Figure 5B:
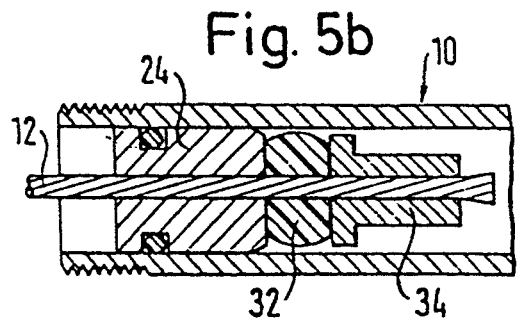
Figure 6A:
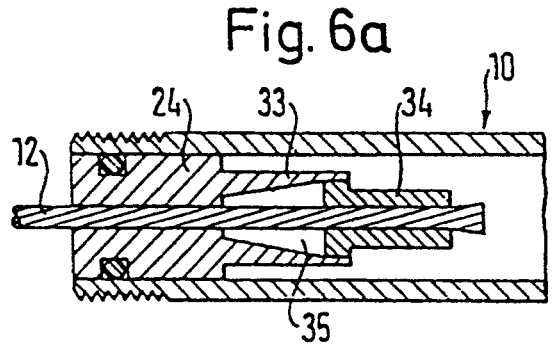
Figure 6B:
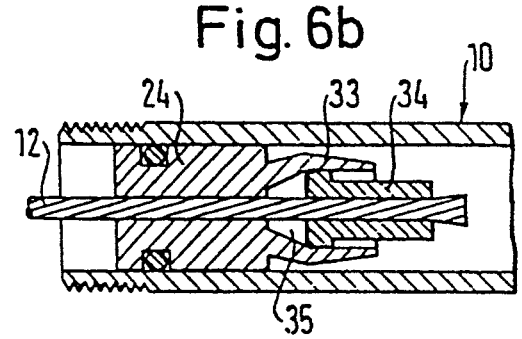
Figure 7A:
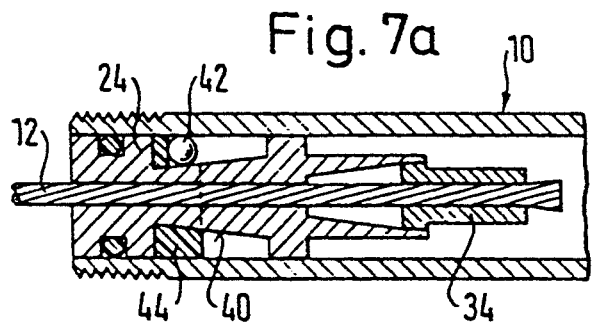
Figure 7B:
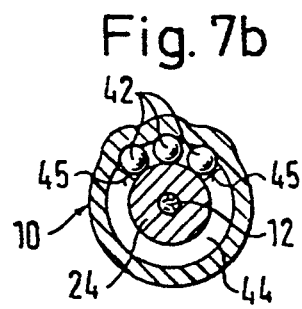
Figure 8A:
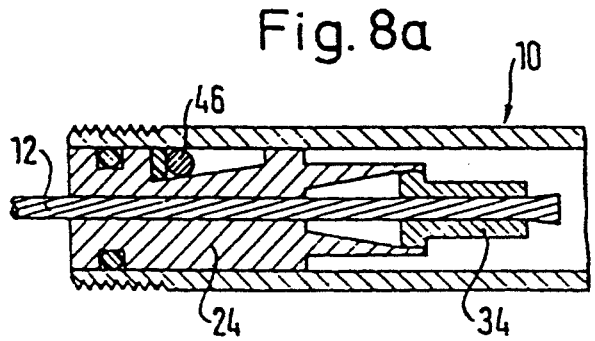
Figure 8B:
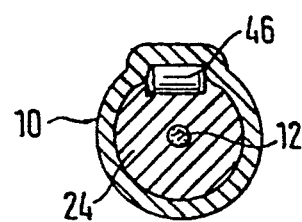
Figure 9A:
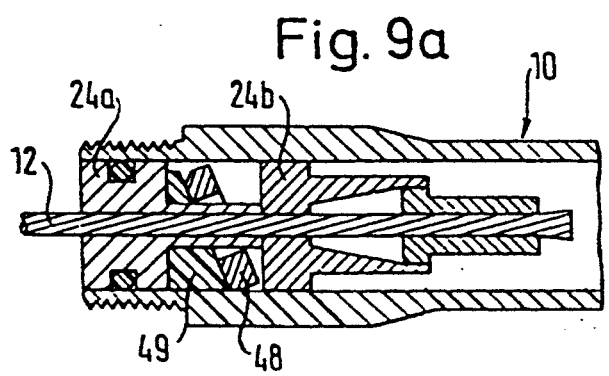
Figure 9B:
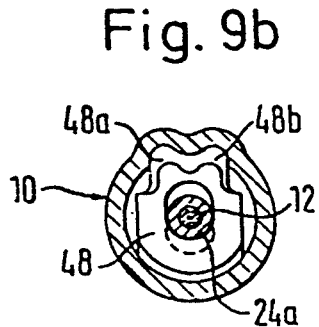

FIGS. 5a and 5b each show a longitudinal section of the piston/cylinder unit having a damping means according to the second embodiment;

FIGS. 6a and 6b show sectional views analogous to FIGS. 5a and 5b but with another embodiment of the damping means;

FIGS. 7a and 7b show a longitudinal section and a cross-section of a further embodiment in which the piston/cylinder unit forms an energy converter at the same time;

FIGS. 8a and 8b show sectional views analogous to FIGS. 7a and 7b but in another embodiment; and FIGS. 9a and 9b show sectional views analogous to FIGS. 7a to 8b but in another embodiment.

In the diagram of FIG. 1, as curve D the pressure variation of the gases generated by a pyrotechnical gas generator as used for belt pretensioners in safety belt restraining systems is plotted as a function of the time t. FIG. 2 shows schematically such a belt pretensioner having a piston/cylinder linear drive 10 which via a pulling cable 12 engages on the periphery of a pulley 14 which by means of a clamping roller coupling mechanism 16 is adapted to be coupled to a belt reel 18 of a belt retractor, on which the webbing 20 is coiled. The linear drive 10 consists of a cylinder 22 and a piston 24 which is received displaceably therein and engages on the free end of the pulling cable 12, the end face of said piston being subjectable to gases under high pressure which are generated by a gas generator 26 as soon as it is fired by an electrical or mechanical igniter. In the conventional construction of the belt pretensioner shown in FIG. 2 the piston 24 is firmly pressed onto the end of the pulling cable 12.

The gas generator 26 is inserted into a bore of the housing block 28 in which a curved passage 30 is formed through which the gases generated by the gas generator 26 on ignition of the latter are conducted to the end face of the piston 24. As apparent from FIG. 1, in conventional constructions of the gas generator 26 the gas pressure D first rises steeply and after as little as 0.75 ms reaches a maximum of about $76 \times 10^6$ Pa. Thereafter the pressure D drops equally steeply and after about 2.5 ms is only a fraction of about 10% of the maximum gas pressure reached. Thus, almost the entire energy liberated by the gas generator is available during a short period of 2 to 3 ms. This period is considerably shorter than that which the piston 24 requires to cover the distance of, for example, 250 mm up to the end of the cylinder 22.

In the linear drive constructed according to the invention, the first embodiment of which is illustrated in FIG. 4, the force exerted by the piston 24 is not transmitted directly to the pulling cable 12 but via a damping means 32. Said damping means 32 is formed by a plurality of plate springs which are arranged in series on the end of the pulling cable 12 and bear on the one hand on the adjacent end face of the piston 24 and on the other hand on a stop member 34 firmly pressed onto the end of the pulling cable 12. On activation of the gas generator 26, for example as indicated in FIG. 4 by means of percussion ignition, the piston 24 is pushed forwardly in the cylinder 10, the plate springs of the damping means 32 being compressed as soon as the pulley 14 is coupled non-rotatably to the belt reel 18 via the coupling 16 and the pulling cable 12 is tensioned, since the inertia moment of the belt reel 18 and the webbing 20 coiled thereon must be overcome. FIG. 3 shows development of the pulling force F built up in the pulling cable 12 in dependence upon the distance s covered. As apparent from the diagram, the force F increases progressively in the initial phase of the piston movement. The belt reel 18 is now set in rotation by the force F engaging the periphery of the pulley 14 and after a short travel of the piston of about 16 mm has already reached an extremely high speed of rotation.

The diagram in FIG. 1 also shows the variation of the acceleration G of the piston 24 as a function of the time t. A striking aspect of the diagram is that the curve G has a similar profile to the curve D and in particular the apex thereof is likewise reached at about 0.75 ms. The gas pressure D is thus employed in optimum manner in the acceleration of the piston 24. The damping means is effective during the entire initial phase of the piston movement up to about 1 ms.

The diagram of FIG. 1 also shows the distance s covered by the piston 24 as a function of the time t. The piston covers the greater part of the travel up to the end of the cylinder 10, for example a total of about 200 mm, under low pressure action. After expiry of about 2.5 to 3 ms the piston 24 flies further in the cylinder 22 due to its mass inertia. By forming relief bores in the wall of the cylinder 10 at about half the total length thereof, it has been shown that the remaining gas pressure D then provides only a small contribution to the pretensioner power. The belt reel 18 continues its rotational movement substantially due to its moment of inertia. The damping means 32 according to the invention achieves that the force profile (FIG. 3) is optimized for optimum storage of the energy liberated by the gas generator within at the most about 3 ms in the form of mechanical energy of rotation of the belt reel 18 and of the webbing 20 coiled thereon. The stored mechanical energy suffices to complete the pretensioning of the webbing with the desired pretensioner travel.

Two further embodiments of the damping means are illustrated in FIGS. 5 and 6.

In the embodiment according to FIG. 5, between the piston 24 and the stop member 34 a damping means 32 is arranged in the form of a cylindrical body of resiliently yieldable material having an axial passage for the pulling cable 12. As shown in FIG. 5b, said body is resiliently and at the same time plastically deformed when the tension in the pulling cable rises.

In the embodiment according to FIG. 6, on the end side of the piston 24 facing the stop member 34 a wall 33 is integrally formed, the outer surface of which is cylindrical and which defines a frustoconical space 35 which is coaxial with the cylinder 10 and widens towards the free end of the wall 33. In the rest state shown in FIG. 6a the stop member 34 penetrates into the outer end of the space 35. Now, as soon as the tensile force in the pulling cable 12 rises the stop member 34 is pulled further into the space 35, the wall 33 being expanded and plastically deformed. FIG. 6b shows this state.

According to the embodiment illustrated in FIGS. 6a to 9a a plate substantially extending transversely to the pulling cable 12 forms the expansion body of the stop member 34 for the wall 33. The edges of the plate on the side directed to the wall 33, which will be deformed plastically, are rounded. The radius of the curvature is approximately 1 mm, but could also be approximately 1 to 2 mm.

In both embodiments (FIGS. 5 and 6) fundamentally the force profile shown in FIG. 3 is achieved. Depending on the construction of the damping means, however, the profile of the force F in dependence upon the travel s can vary; in every case, by dimensioning of the the damping means the force profile can be optimized, so that the energy liberated by the gas generator within a short time can be transferred in optimum manner to a pretensioner mechanism in order to be stored there as mechanical energy and be available for a longer period for the pretensioning of the webbing.

In the embodiment according to FIG. 7, which is fundamentally the same as that of FIG. 6, on the piston 24 a frustoconical ramp surface 40 is formed by a constriction and on only one side of the piston 24 three balls 42 are held in engagement with the inner side of the cylinder 10 by a guide member 44 of resilient material at the lowest portion of said ramp surface 40. As is apparent from FIG. 7b, the guide member 44 comprises two shoulders 45 by which the balls 42 are held on said side of the piston 24. On the radially opposite side the piston 24 bears slidingly on the inner side of the cylinder 10. On movement of the piston 24 under the action of the gas pressure generated by the gas generator said balls 42 do not resist said movement. At the end of the pretensioning travel, as soon as due to the pulling in the pulling cable 12 a reversal of the movement direction of the piston 24 occurs, the balls 42, now acting as blocking balls, are brought into engagement with the wall of the cylinder 10, since they are pressed radially outwardly by the ramp surface 40. On further movement of the piston 24 the balls 42 penetrate into the material of the wall of the cylinder 10 and deform said material plastically. FIG. 7b shows this state. Following the belt pretensioning, the arrangement acts as energy converter diminishing the load peaks in the belt system. By using only a few balls, elastic deformations of the cylinder 10 are avoided, which otherwise would lead to an irregular energy conversion and occurrence of load fluctuations in the belt system. As long as the forces introduced via the pulling cable 12 do not exceed a value of about 5000 N, which can be achieved precisely in conjunction with a belt pretensioner of optimum action, the energy conversion should be effected with only a few deformation elements, so that each of them penetrates into the material of the cylinder wall to a relatively great depth.

In the embodiment of FIG. 8, instead of the three balls in FIG. 7 a roller 46 is employed which is provided at its side ends with a rounded portion, so that it can penetrate generally and without any cutting action into the material of the cylinder wall. The mode of operation is fundamentally the same as in the embodiment of FIG. 7.

In the embodiment according to FIG. 9 the piston is divided into two piston parts 24a, 24b which are arranged loosely axially spaced apart from each other on the pulling cable 12. In the space between the piston parts 24a, 24b a plate is arranged which in the rest state shown in FIG. 9a is inclined at an angle of about 30° to the axis of the cylinder 10. At its one end the plate 48 bears slidingly on the inner side of the cylinder 10 and at its radially opposite end is provided with two deformation members 48a, 48b. A wedge-shaped guide member 49 holds the plate 48 with its deformation members 48a, 48b resiliently in engagement with the inner side of cylinder 10.

The plate 48 does not oppose the movement of the piston 24a, 24b for pretensioning the webbing; on opposite movement it straightens up so that the deformation members 48a, 48b penetrate into the material of the wall of the cylinder 10 and plastically deform the latter. This state is shown in FIG. 9b. The mode of operation is fundamentally the same as in the embodiments according to FIGS. 7 and 8.

I claim:

1. A linear drive for a belt pretensioner in a vehicle safety belt system, comprising:
    a pyrotechnical gas generator;
    a piston/cylinder unit which is activatable by the gases generated by said generator; and
    a pulling cable being connected to said piston of said piston/cylinder unit in a manner to establish a flow path of force between said piston and said cable which comprises a deformable damping means dimensioned to limit the force exerted by said piston on said cable in a phase of pressure rise of gas released by said gas generator and to allow said force to rise continuously, said damping means being effective during an entire initial phase of piston movement in which the gas pressure provided by the gas generator rises.

2. A linear drive as set forth in claim 1, wherein said gas generator includes means for generating a gas pressure which after ignition rises steeply, within about 0.5 to 1 ms after ignition has reached a maximum, thereafter drops again and about 3 ms after ignition has dropped to less than 10% of said maximum.

3. A linear drive as set forth in claim 2, wherein said damping means includes means for permitting movement of said piston relative to said cable over about 5 to 15% of the total distance of a stroke of said piston.

4. A linear drive as set forth in claim 1, wherein said damping means includes means for transmitting a progressively increasing force from said piston to the pulling cable during the initial phase of piston movement.

5. A linear drive as set forth in claim 1, wherein said piston is provided with an axial bore through which one end of said pulling cable is led without being fixed to said piston, a stop member is secured on a free end of said cable at an axial distance from said piston and said damping means is arranged between said stop member and an end face of said piston facing said stop member.

6. A linear drive as set forth in claim 5, wherein said damping means includes a body of resiliently and/or plastically deformable material provided with a passage for said pulling cable.

7. A linear drive as set forth in claim 5, wherein said damping means includes a spring means surrounding said pulling cable.

8. A linear drive as set forth in claim 7, wherein said spring means includes a plurality of plate spring elements arranged in series along said pulling cable.

9. A linear drive as set forth in claim 5, wherein said damping means includes a plastically deformable member which has generally axially extending wall portions which are deformed in a radial direction when said piston approaches said stop member.

10. A linear drive as set forth in claim 9, wherein said plastically deformable member is generally cup-shaped and has a cylindrical peripheral wall which forms a frustoconical space, an expansion body is located on said stop member and penetrates the frustoconical space when said piston approaches said stop member.

11. A linear drive as set forth in claim 10, wherein said cup-shaped member is integrally formed on an end of said piston opposite said stop member and said expansion body is integrally formed with said stop member.

12. A linear drive as set forth in claim 10, wherein said expansion body is formed by a plate extending substantially transversely to said pulling cable, said plate having a rounded edge on its side facing said plastically deformable member.

13. A linear drive as set forth in claim 12, wherein said rounded edge has a curvature which is approximately 1 mm to 2 mm.

14. A linear drive as set forth in claim 1, wherein said piston is associated with at least one deformation member which on movement of said piston in a direction opposite to the direction of piston movement on activation of said gas generator plastically deforms a wall of said cylinder of said piston/cylinder unit.

15. A linear drive as set forth in claim 14, wherein said deformation member is effective on only one radial side of said piston, said piston having a radially opposite surface portion which slidingly bears on the inner side of said cylinder wall.

16. A pretensioner drive for a vehicle safety belt system, said drive comprising:
   a cylinder;
   a piston located within said cylinder and movable relative to said cylinder through a pretensioning stroke;
   gas source means for providing a gas pressure to move said piston relative to said cylinder in response to sudden vehicle deceleration;
   cable means for transmitting a pulling force from said piston to a belt tensioning device; and
   damping means interconnecting said piston and said cable means for limiting the force exerted by the piston on said cable means during an entire initial period as the gas pressure increases and for permitting said piston to move relative to said cable during the entire initial period and thereafter to move said cable.

17. A pretensioner drive as set forth in claim 16, wherein said damping means includes an elastically deformable part.

18. A pretensioner drive as set forth in claim 16, wherein said damping means includes a plastically deformable part and a part which deforms the plastically deformable part upon movement of said piston relative to said cable means.

* * * * *